(12) United States Patent
Whitman

(10) Patent No.: US 8,596,714 B2
(45) Date of Patent: Dec. 3, 2013

(54) VEHICLE SEAT STORAGE COMPARTMENT

(75) Inventor: Daniel W. Whitman, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 440 days.

(21) Appl. No.: 12/872,427

(22) Filed: Aug. 31, 2010

(65) Prior Publication Data

US 2012/0049559 A1  Mar. 1, 2012

(51) Int. Cl.
*A47C 7/62* (2006.01)

(52) U.S. Cl.
USPC ............. 297/188.09; 297/188.13; 296/37.15; 224/275

(58) Field of Classification Search
USPC ............. 297/188.09, 188.11, 188.13, 188.19, 297/188.17, 188.14; 296/37.15; 224/275, 224/281
See application file for complete search history.

(56) References Cited

U.S. PATENT DOCUMENTS

| | | | | |
|---|---|---|---|---|
| 928,107 | A * | 7/1909 | Collings | 4/478 |
| 2,736,320 | A * | 2/1956 | Roberts | 131/235.1 |
| 4,685,729 | A * | 8/1987 | Heesch et al. | 297/188.09 |
| 4,783,037 | A * | 11/1988 | Flowerday | 248/311.2 |
| 5,228,611 | A * | 7/1993 | Yabuya | 224/281 |
| 5,246,269 | A * | 9/1993 | DeBoer et al. | 297/227 |
| 5,775,771 | A * | 7/1998 | La Cour et al. | 297/238 |
| 5,911,470 | A * | 6/1999 | Aumond | 297/115 |
| 6,419,313 | B1 * | 7/2002 | Newman | 297/188.1 |
| 6,419,314 | B1 * | 7/2002 | Scheerhorn | 297/188.19 |
| 6,435,587 | B1 * | 8/2002 | Flowerday et al. | 296/37.8 |
| 6,450,468 | B1 * | 9/2002 | Hamamoto | 248/311.2 |
| 6,672,554 | B2 * | 1/2004 | Fukuo | 248/311.2 |
| 6,719,344 | B2 * | 4/2004 | Ono et al. | 296/24.34 |
| 6,719,367 | B2 * | 4/2004 | Mic et al. | 297/188.19 |
| 6,869,121 | B2 * | 3/2005 | Kayumi et al. | 296/37.15 |
| 7,014,241 | B2 * | 3/2006 | Toyota et al. | 296/37.15 |
| 7,600,811 | B2 * | 10/2009 | Park et al. | 297/144 |
| 7,658,442 | B1 * | 2/2010 | Whiteside et al. | 297/188.11 |
| 2003/0080593 | A1 * | 5/2003 | Walkinshaw et al. | 297/188.01 |
| 2005/0104422 | A1 * | 5/2005 | Okamoto | 297/188.11 |
| 2008/0136220 | A1 * | 6/2008 | Park et al. | 297/135 |

FOREIGN PATENT DOCUMENTS

JP  06144118 A * 5/1994 ............... B60R 7/06
JP  2008220590 A  9/2008

* cited by examiner

*Primary Examiner* — David E Allred
(74) *Attorney, Agent, or Firm* — Quinn Law Group, PLLC

(57) ABSTRACT

A vehicle seat assembly includes a lower seat portion with a bin defining a compartment within the lower seat portion for storing an item. A lid is connected to the bin and has a closed position in which the compartment is closed by the lid and an open position in which the compartment is substantially uncovered. The bin and the lid are configured so that the lid slides forward of the lower seat portion to the open position. The lid may slide along an arc defined by slots in the bin.

12 Claims, 4 Drawing Sheets

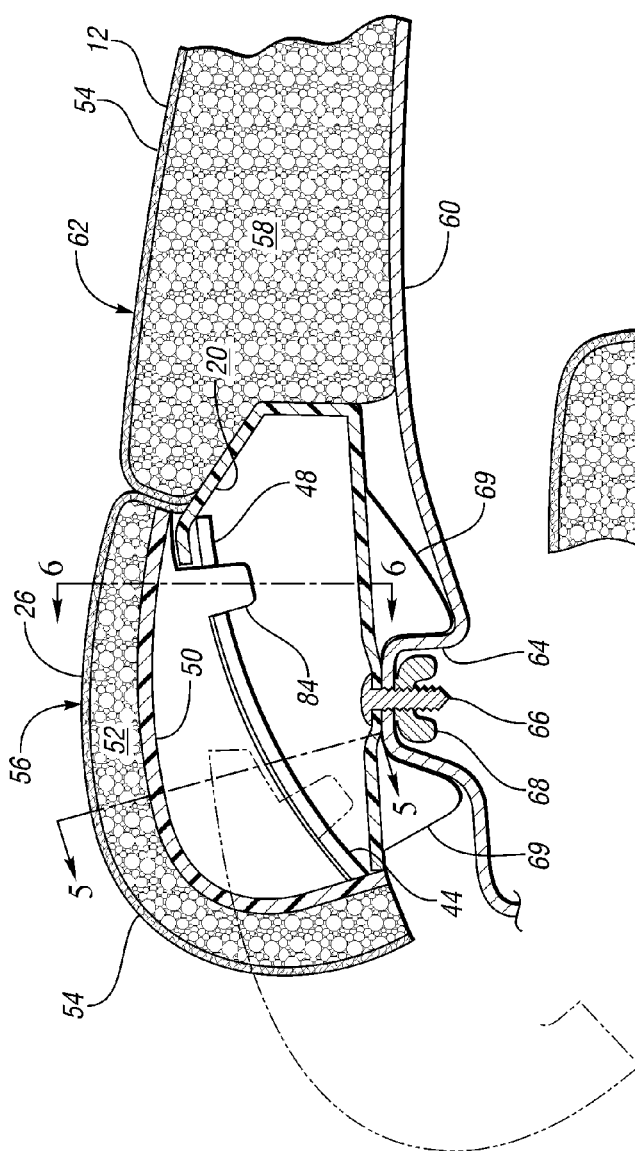
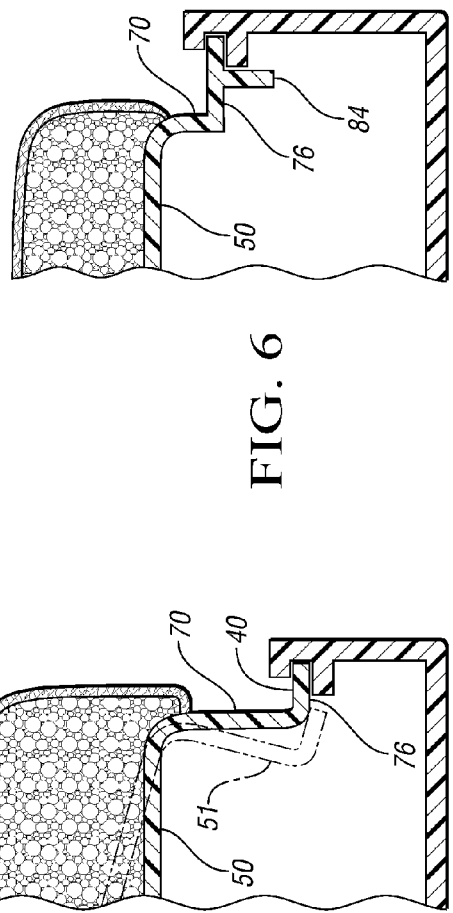

VEHICLE SEAT STORAGE COMPARTMENT

TECHNICAL FIELD

The invention relates to a vehicle seat assembly having a storage compartment.

BACKGROUND

Vehicle storage compartments provide convenient storage options. Vehicle designers are challenged to provide storage compartments while maximizing interior passenger space. Vehicles are often equipped with center consoles having storage compartments. Glove compartments are typically available for additional storage. Access to these compartments may require depressing or turning release latches. Locating items stored in these compartments may not be convenient while driving. Some vehicle seats have integrated cup holders. Some of these seat-integrated cup holders pivot from a stowed position in which they are covered and flush with the seat to a use position. Other vehicle seats have a lower seat portion with storage by providing a hinge across the entire lower seat portion for opening the lower seat portion, or a drawer that slides forward.

SUMMARY

A vehicle seat assembly includes a lower seat portion with a bin defining a compartment within the lower seat portion for storing an item. A lid is connected to the bin and has a closed position in which the compartment is closed by the lid and an open position in which the compartment is substantially uncovered. The bin and the lid are configured so that the lid slides forward of the lower seat portion to the open position. The lid may slide along an arc defined by slots in the bin. The bin and lid may be located at the center of a forward extremity of the lower seat portion, so that the lid is at least somewhat downward and forward of the forward extremity when in the open position. This allows the bin and lid to be in an area of the lower seat portion that is not typically covered by a seated occupant and is easily accessible to the occupant, such as between the legs of the occupant. When the lid slides to the open position along the arc, it is closer to the lower seat portion than if it slid linearly outward. Thus, the open lid will not obstruct entry and egress by the occupant and is less apt to be knocked into if left open.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 4 is a schematic cross-sectional illustration of the lower seat portion, bin, and lid taken at the arrows 4-4 in FIG. 1, with the lid in a closed position and showing the lid in phantom in an open position;

FIG. 5 is a schematic cross-sectional illustration of the bin and lid taken at the arrows 5-5 in FIG. 4 and showing a portion of the lid flexing in phantom;

FIG. 6 is a schematic cross-sectional illustration of the bin and lid taken at the arrows 6-6 in FIG. 4;

DETAILED DESCRIPTION

Figure 1:
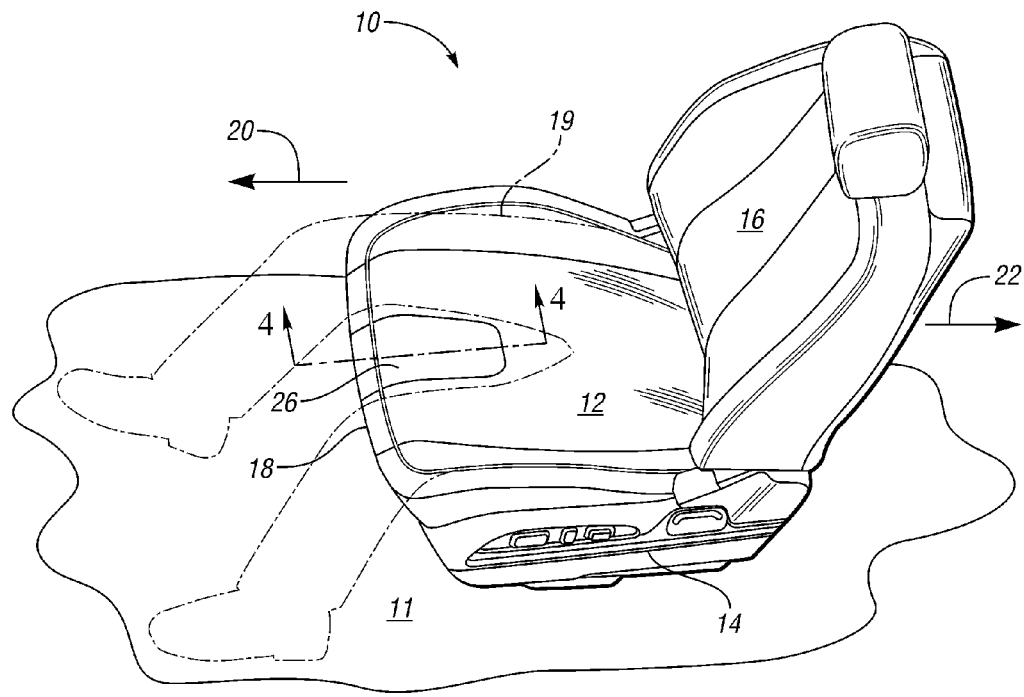
FIG. 1 is a schematic illustration in perspective view of a vehicle seat having a lower seat portion and a lid covering a bin (shown partially in FIG. 2) within the lower seat portion.

Referring to the drawings, wherein like reference numbers refer to like components throughout the several views, FIG. 1 shows a vehicle seat assembly 10 mounted to a floor 11 of a vehicle to face forward in the vehicle. The vehicle seat assembly 10 includes a lower seat portion 12 connected to a seat track 14 that is mounted to the floor 11. A seat back portion 16 is connected with the lower seat portion 12. The seat assembly 10 is configured for a person to sit on the lower seat portion 12 with their back resting against the seat back portion 16 so that they will be facing forward with their feet forward of a forward extremity 18 of the lower seat portion 12. A lower body portion of a person is indicated in phantom at 19 in an expected seated position. A forward direction with respect to the seat assembly 10 is indicated by arrow 20. A rearward direction with respect to the seat assembly 10 is indicated by arrow 22.

Figure 2:
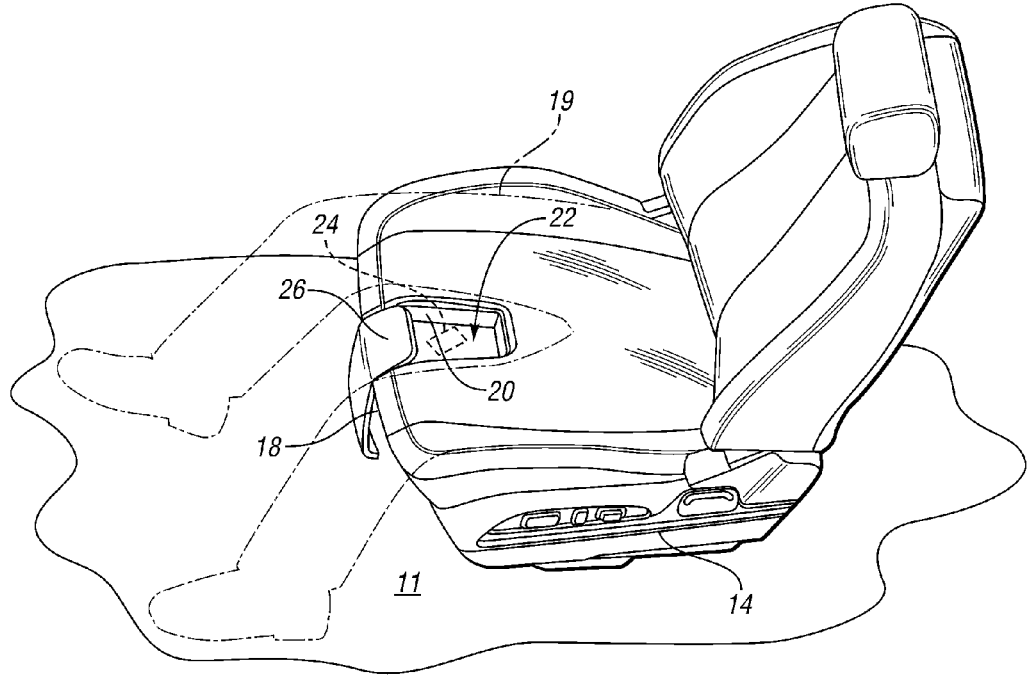
FIG. 2 is a schematic illustration in perspective view of the vehicle seat of FIG. 1 with the lid slid to an open position to substantially uncover a compartment defined by the bin.

Referring to FIG. 2, a bin 20 is contained within the lower seat portion 12 and defines a compartment 22 for storing an item 24, such as a cell phone, candy, gum, etc. A rubber matt (not shown) may line the bottom of the compartment 22 to help prevent sliding of the item 24 within the compartment 22. A lid 26 is connected to the bin 20 and is in an open position in FIG. 2 so that the bin 20 is substantially uncovered. In FIG. 1, the lid 26 is in a closed position, covering the bin 20 and the stored item 24. The bin 20 and lid 26 are substantially in the center of the forward extremity 18 of the lower seat portion 12, in an area generally unused due to knee splay of a seated occupant. That is, a person's lower body portion 19 generally surrounds the area without resting on it due to knee splay, as shown in FIGS. 1 and 2. Thus the bin 20 and lid 26 are easily accessible to the seated occupant, and are in a generally unused portion within the lower seat portion 12 so the storage compartment 22 does not decrease interior passenger space. The bin 20 and lid 26 do not interfere with seat comfort or operation. Further, the lid 26 moves along an arc to the open position of FIG. 2 so that it moves somewhat downward and forward of the foremost extremity 18 to a position where it is unlikely to be jarred if left open when the occupant exits the seat assembly 10. Movement of the lid 26 between the open and closed positions and the structure of the lid 26 and bin 20 is discussed below.

Figure 3:
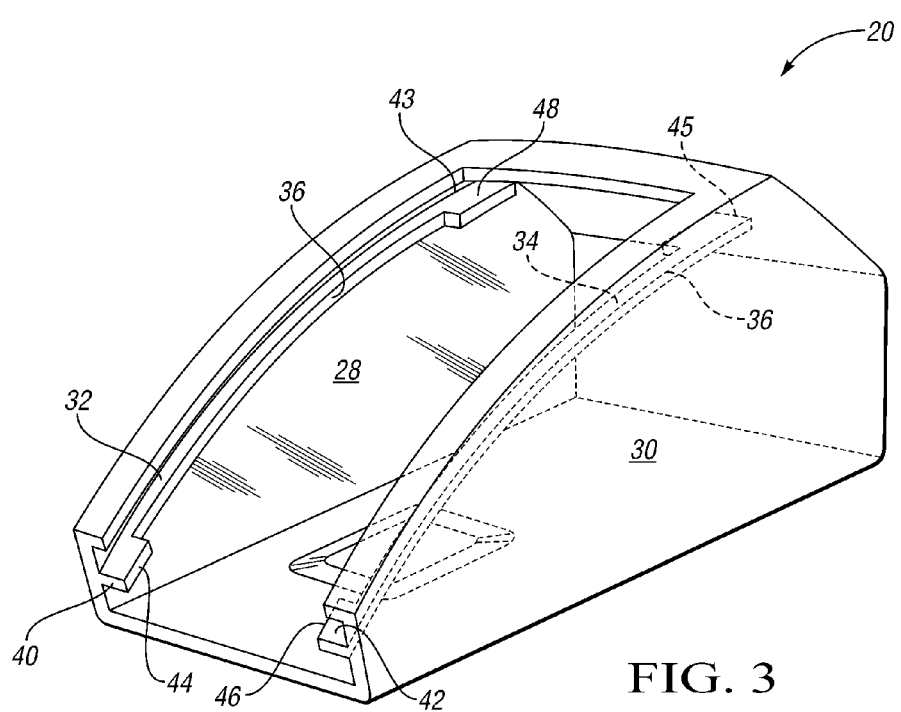
FIG. 3 is a schematic illustration in perspective view of the bin of FIG. 2.

Referring to FIG. 3, the bin 20 is shown without the lid 26 and detached from the lower seat portion 12. The bin 20 has a first side wall 28 and an opposing second side wall 30 that are generally parallel with one another. Side wall 28 forms a first slot 32 and side wall 30 defines a second slot 34 that is not visible in FIG. 3 but is a mirror image of slot 32. The side walls 28, 30 are formed so that the slots 32, 34 are each in the shape of an arc, i.e., a portion of a circumference of a circle. The arc defined by the slots is indicated by arc 36 shown with hidden lines and defined by the surfaces of the side walls 28, 30 that form the slots 32, 34. The side walls 28, 30 with slots 32, 34 form an integrated track for the lid 26. The lid 26 of FIGS. 1 and 2 rests on the surfaces of the walls 28, 30 forming the slots 32, 34 and moves along the arc 36 defined by the walls 28, 30 as discussed below.

The slots 32, 34 each have a forward end 40, 42, i.e., an end that is positioned forward-most in the vehicle on the seat assembly 10. The sidewalls 28, 30 each have a respective extension 44, 46 formed at the forward ends 40, 42 of the slots 28, 32. The extensions 44, 46 extend away from the respective sidewalls 28, 30 toward the center of the compartment 22. Similar extensions are formed at the rearward ends 43, 45 of the slots 28, 32. Only one such extension 48 is visible in FIG. 3. Another extension 49 is a mirror image of extension 48 at the rearward end of slot 34, and is shown in hidden view in FIG. 8.

Referring to FIG. 4, the lid 26 is shown attached to the bin 20. The lid 26 has a base 50 covered by a lid cushion 52 and material 54 such as cloth or leather forming an outer surface 56 of the lid 26. The lower seat portion 12 also includes a seat cushion 58 connected to a steel seat frame 60 and covered by the same material 54 as the lid 26. The material 54 forms a seating surface 62. When the lid 26 is in the closed position of FIG. 4, it is substantially flush with the lower seat portion 12 as the outer surface 56 of the lid is substantially flush with the seating surface 62 of the lower seat portion 12.

The seat frame 60 has a projection 64 at which the bin 20 is attached with a screw 66 and push nut 68. Other methods of attaching the bin 20 to the seat frame 60 may also be used. The bin 20 has downwardly projecting ribs 69 shaped to fit around the projection 64 and rest on the seat frame 60 to stabilize the bin 20. The base 50 of the lid 26 and the bin 20 may be injection-molded plastic or other suitable material. Injection molding the bin 20 allows the slots 32, 34 and projecting ribs 69 to be integrally formed with the main portion of the bin 20 defining the compartment 22.

Figure 8:
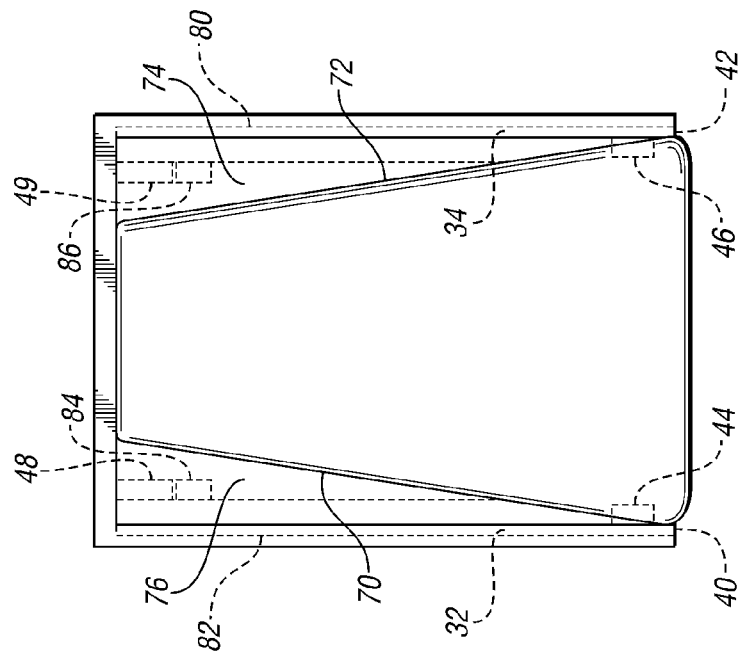
FIG. 8 is a schematic illustration in plan view of the bin and lid of FIG. 7 with the lid cushion removed and the lid in the closed position.
Figure 7:
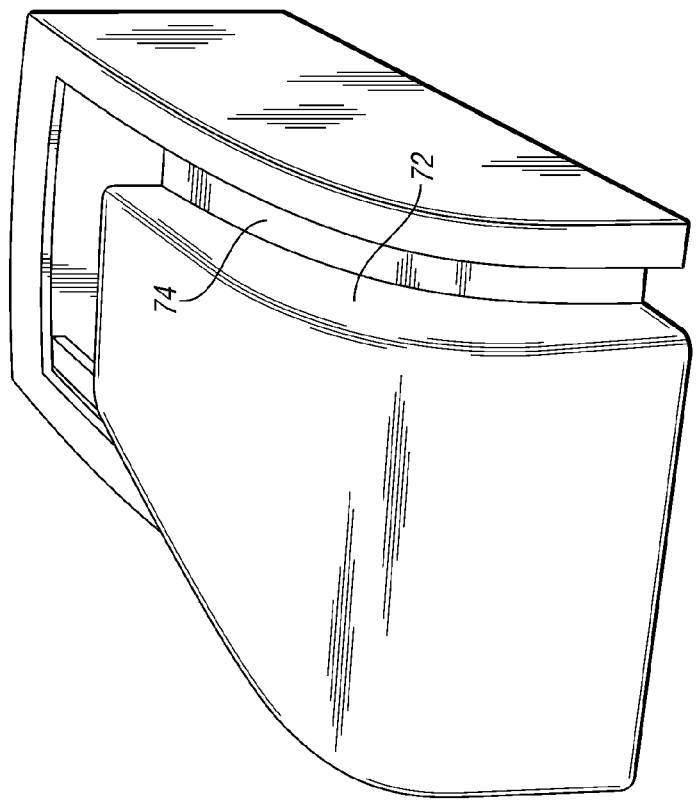
FIG. 7 is a schematic illustration in perspective view of the bin and lid with a lid cushion removed and the lid partially open.

The base 50 has a right side wall 70 shown in FIG. 5 and a left side wall 72 shown in FIG. 7, in which the lid cushion 52 is removed for clarity. The side walls 70, 72 taper in a rearward direction toward one another, as shown in FIG. 8. Each side wall 70, 72 has a respective side flange 76, 74 extending laterally and running substantially along the length of the base 50. The side flanges 74, 76 have the same arc shape as the slots 32, 34 of FIG. 3. As shown in FIG. 5, the base 50 is somewhat flexible to the flexed position 51 shown in phantom to allow the flanges 76, 74 to be inserted into the respective slots 32, 34 (flange 74 shown inserted into slot 32 in FIG. 8). FIG. 8 shows that each of the flanges 74, 76 has a respective edge 80, 82. The edges 80, 82 are parallel with one another and with the slots 32, 34. The flanges 74, 76 widen in a rearward direction to accommodate the tapering side walls 70, 72 and the parallel edges 80, 82.

Referring to FIGS. 4 and 6, a tab 84 extends downward from the side flange 76. As shown in FIG. 4, the tab 84 interferes with extensions 44, 48 at the forward end 40 and rearward end 43 of the slot 32 to limit travel of the lid 26 between the closed position of FIG. 4 and the open position shown in phantom in FIG. 4. As shown in hidden view in FIG. 8, a similar tab 86 extends downward from the side flange 74 and interferes with extensions 46, 49 at the forward end 42 and rearward end 45 of slot 34 to limit travel of the lid 26.

Each seat in a vehicle could be equipped with a bin 20 and lid 26. Unused, available space within the lower seat portion 12 is used to store frequently used items and is easily accessible to the seated occupant.

While the best modes for carrying out the invention have been described in detail, those familiar with the art to which this invention relates will recognize various alternative designs and embodiments for practicing the invention within the scope of the appended claims.

The invention claimed is:
1. A vehicle seat assembly comprising:
a lower seat portion having a foremost extremity;
a bin fixed within the lower seat portion, the bin defining a compartment within the lower seat portion for storing an item, the bin having substantially parallel opposing side walls, each side wall defining a respective slot and having an extension near a forward end of the respective slot;
a lid connected to the bin, the lid having:
sides that that taper toward one another in a rearward direction;
side flanges that widen in the rearward direction and have edges that are substantially parallel with one another and with the opposing side walls, each side flange having a respective tab extending therefrom;
wherein the lid has a closed position in which the compartment is closed by the lid and an open position in which the compartment is substantially uncovered;
wherein the bin and the lid are configured such that the flanges ride in the slots as the lid slides between the closed position and the open position;
wherein the bin and the lid are configured so that the lid slides forward and downward with respect to the foremost extremity of the lower seat portion to the open position;
wherein the extension of each of the side walls interferes with the respective tab to stop forward movement of the lid in the open position; and
wherein the lid is at least partially lower in the open position than in the closed position.

2. The vehicle seat assembly of claim 1, wherein the slots are each in the shape of an arc.

3. The vehicle seat assembly of claim 1, wherein the lower seat portion includes a frame with a projection; wherein the bin is fixedly attached to the frame at the projection; and wherein the bin has ribs that rest on the frame adjacent the projection to stabilize the bin.

4. The vehicle seat assembly of claim 1, wherein the lower seat portion includes a seat cushion forming a seating surface; wherein the lid has a base covered by a lid cushion; and wherein the lid cushion is substantially flush with the seating surface when the lid is in the closed position.

5. The vehicle seat assembly of claim 1, wherein the lid is positioned substantially at a center of the foremost extremity of the lower seat portion such that it is accessible between the legs of an occupant of the seat assembly.

6. A vehicle seat assembly comprising:
a lower seat portion having a foremost extremity;
a bin defining a compartment within the lower seat portion for storing an item, the bin having substantially parallel opposing side walls, each side wall defining a respective slot;
a lid connected to the bin, the lid having:
sides that that taper toward one another in a rearward direction;
side flanges that widen in the rearward direction and ride in the slots as the lid slides relative to the bin, each of the side flanges having edges that are substantially parallel with one another and with the opposing side walls;
wherein the lid is slidable fore and aft relative to the bin along an arc to substantially uncover and cover the compartment; and wherein the lid slides at least partially downward and forward of the foremost extremity of the lower seat portion to uncover the bin to thereby limit extension of the lid forward of the lower seat portion.

7. The vehicle seat assembly of claim 6, wherein the lid is substantially flush with an upper surface of the lower seat portion when the lid substantially covers the compartment.

8. The vehicle seat assembly of claim 6, wherein each of the flanges has a respective tab extending therefrom; and wherein each side wall has an extension near a forward end of the respective slot that interferes with the respective tab to stop forward movement of the lid.

9. The vehicle seat assembly of claim 6, wherein the lower seat portion includes a frame with a projection; wherein the bin is connected to the frame at the projection; and wherein the bin has ribs that rest on the frame adjacent the projection to stabilize the bin.

10. The vehicle seat assembly of claim 6, wherein the lower seat portion includes a seat cushion forming a seating surface; wherein the lid has a base covered by a lid cushion forming a lid surface; and wherein the lid surface is substantially flush with the seating surface when the lid substantially covers the compartment.

11. The vehicle seat assembly of claim 6, wherein the lid is positioned substantially at a center of a foremost extremity of the lower seat portion.

12. A vehicle seat assembly comprising:
a lower seat portion;
a bin defining a compartment within the lower seat portion for storing an item, the bin having opposing side walls, each side wall defining a respective slot and having an extension near a forward end of the respective slot;
a lid connected to the bin, the lid having:
   sides that taper toward one another in a rearward direction,
   side flanges that widen in a rearward direction and have edges that are substantially parallel with one another and with the opposing side walls, each side flange having a respective tab extending therefrom;
wherein the lid occupies one of a closed position in which the compartment is closed by the lid and an open position in which the compartment is substantially uncovered;
wherein the bin and the lid are configured so that the flanges ride in the slots as the lid is slid between the closed position and the open position; and
wherein the extension of each of the side walls interferes with the respective tab to stop forward movement of the lid at the open position.

* * * * *